(12) United States Patent
Ghosh et al.

(10) Patent No.: US 10,158,555 B2
(45) Date of Patent: Dec. 18, 2018

(54) FACILITATION OF ROUTE OPTIMIZATION FOR A 5G NETWORK OR OTHER NEXT GENERATION NETWORK

(71) Applicant: AT&T Intellectual Property I, L.P., Atlanta, GA (US)

(72) Inventors: Arunabha Ghosh, Austin, TX (US); Milap Majmundar, Austin, TX (US); Thomas David Novlan, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/376,137

(22) Filed: Dec. 12, 2016

(65) Prior Publication Data

US 2018/0091416 A1 Mar. 29, 2018

Related U.S. Application Data

(60) Provisional application No. 62/401,878, filed on Sep. 29, 2016.

(51) Int. Cl.
*H04W 84/12* (2009.01)
*H04L 12/751* (2013.01)
(Continued)

(52) U.S. Cl.
CPC .......... *H04L 45/02* (2013.01); *H04L 43/0852* (2013.01); *H04L 45/122* (2013.01);
(Continued)

(58) Field of Classification Search
CPC . H04W 72/0413; H04W 8/005; H04W 40/02; H04W 76/38; H04L 45/00; H04L 43/00; H04L 45/12
See application file for complete search history.

(56) References Cited

U.S. PATENT DOCUMENTS

| 7,002,949 B2 | 2/2006 | Garcia-luna-aceves et al. |
| 7,020,110 B2 | 3/2006 | Walton et al. |
(Continued)

FOREIGN PATENT DOCUMENTS

| CN | 1627849 A | 6/2005 |
| CN | 101631355 A | 1/2010 |
(Continued)

OTHER PUBLICATIONS

International Search Report and Written Opinion for Application No. PCT/US2017/052582, dated Dec. 6, 2017, 16 pages.
(Continued)

*Primary Examiner* — Andrew Lee
(74) *Attorney, Agent, or Firm* — Amin, Turocy & Watson, LLP

(57) ABSTRACT

A more efficient mesh network can be achieved by optimizing relay hops between node devices. A number of routes can be determined between node devices of various orders. Furthermore, a number of more efficient routes can be determined between the node devices of various orders. Based on the more efficient routes, relay paths between the node devices can either be maintained or terminated. Accordingly, route metrics can be updated dynamically to reevaluate which routes are more efficient than other routes, thereby optimizing system performance.

20 Claims, 12 Drawing Sheets

(51) Int. Cl.

| | | |
|---|---|---|
| *H04W 76/25* | (2018.01) | |
| *H04L 12/26* | (2006.01) | |
| *H04W 40/02* | (2009.01) | |
| *H04W 40/12* | (2009.01) | |
| *H04W 40/24* | (2009.01) | |
| *H04L 12/733* | (2013.01) | |
| *H04L 12/721* | (2013.01) | |
| *H04W 76/34* | (2018.01) | |
| *H04W 84/18* | (2009.01) | |

(52) U.S. Cl.
CPC ........... *H04L 45/123* (2013.01); *H04W 40/02* (2013.01); *H04W 40/12* (2013.01); *H04W 40/248* (2013.01); *H04W 76/25* (2018.02); *H04W 76/34* (2018.02); *H04W 84/18* (2013.01)

(56) References Cited

U.S. PATENT DOCUMENTS

| | | |
|---|---|---|
| 7,260,366 B2 | 8/2007 | Lee et al. |
| 7,551,546 B2 | 6/2009 | Ma et al. |
| 7,636,573 B2 | 12/2009 | Walton et al. |
| 7,698,463 B2 | 4/2010 | Ogier et al. |
| 7,877,067 B2 | 1/2011 | Hwang et al. |
| 7,907,512 B1 | 3/2011 | Von der Embse |
| 8,018,889 B2 | 9/2011 | Lim et al. |
| 8,055,269 B2 | 11/2011 | Feher |
| 8,102,794 B2 | 1/2012 | Shin et al. |
| 8,159,399 B2 | 4/2012 | Dorsey et al. |
| 8,165,536 B2 | 4/2012 | Sekiya et al. |
| 8,189,577 B2 | 5/2012 | Vaswani et al. |
| 8,218,550 B2 | 7/2012 | Axelsson et al. |
| 8,271,043 B2 | 9/2012 | Kim et al. |
| 8,300,555 B2 | 10/2012 | Horn et al. |
| 8,306,525 B2 | 11/2012 | Feher |
| 8,423,068 B2 | 4/2013 | Tiwari et al. |
| 8,509,060 B1 | 8/2013 | Dong et al. |
| 8,537,658 B2 | 9/2013 | Sayana et al. |
| 8,537,714 B2 | 9/2013 | Liu |
| 8,553,560 B2 | 10/2013 | Axelsson et al. |
| 8,578,054 B2 | 11/2013 | Thubert et al. |
| 8,665,797 B2 | 3/2014 | Ding et al. |
| 8,681,747 B2 | 3/2014 | Dateki et al. |
| 8,711,716 B2 | 4/2014 | Chen et al. |
| 8,761,834 B2 | 6/2014 | Luz et al. |
| 8,774,154 B2 | 7/2014 | Bui |
| 8,787,257 B2 | 7/2014 | Fujita |
| 8,798,011 B2 | 8/2014 | Prasad et al. |
| 8,854,997 B2 | 10/2014 | Clow et al. |
| 8,873,496 B2 | 10/2014 | Moulsley et al. |
| 8,948,046 B2 | 2/2015 | Kang et al. |
| 9,007,992 B2 | 4/2015 | Charbit et al. |
| 9,013,974 B2 | 4/2015 | Walton et al. |
| 9,019,068 B2 | 4/2015 | Varoglu |
| 9,037,076 B2 | 5/2015 | Nagata et al. |
| 9,059,753 B2 | 6/2015 | Yang et al. |
| 9,078,187 B2 | 7/2015 | Huh |
| 9,084,261 B2 | 7/2015 | Gholmieh et al. |
| 9,094,145 B2 | 7/2015 | Yue et al. |
| 9,154,198 B2 | 10/2015 | El-najjar et al. |
| 9,154,210 B2 | 10/2015 | Li et al. |
| 9,155,098 B2 | 10/2015 | Geirhofer et al. |
| 9,161,381 B2 | 10/2015 | Lee et al. |
| 9,184,870 B2 | 11/2015 | Sampath et al. |
| 9,191,098 B2 | 11/2015 | Kazmi et al. |
| 9,215,322 B1 | 12/2015 | Wu et al. |
| 9,240,871 B2 | 1/2016 | Walton et al. |
| 9,241,311 B2 | 1/2016 | Sebeni et al. |
| 9,246,651 B2 | 1/2016 | Guo et al. |
| 9,265,053 B2 | 2/2016 | Blankenship et al. |
| 9,288,719 B2 | 3/2016 | Hui et al. |
| 9,306,725 B2 | 4/2016 | Papasakellariou et al. |
| 9,307,489 B2 | 4/2016 | Yerrabommanahalli et al. |
| 9,313,747 B2 | 4/2016 | Zhu et al. |
| 9,337,970 B2 | 5/2016 | Hammarwall et al. |
| 9,338,769 B1 | 5/2016 | Naim et al. |
| 9,357,472 B2 | 5/2016 | Mukherjee |
| 9,401,750 B2 | 7/2016 | Sayana et al. |
| 9,408,220 B2 | 8/2016 | Gore et al. |
| 9,413,509 B2 | 8/2016 | Chen et al. |
| 9,414,427 B2 | 8/2016 | Yang et al. |
| 9,420,577 B2 | 8/2016 | Kim et al. |
| 9,432,876 B2 | 8/2016 | Ji et al. |
| 9,451,476 B2 | 9/2016 | Shoshan et al. |
| 9,467,909 B2 | 10/2016 | Faerber et al. |
| 9,510,340 B2 | 11/2016 | Kim et al. |
| 9,602,183 B2 | 3/2017 | Kim et al. |
| 9,742,480 B1 | 8/2017 | Nammi et al. |
| 10,027,401 B2 | 7/2018 | Speight et al. |
| 2003/0039217 A1 | 2/2003 | Seo et al. |
| 2003/0043756 A1* | 3/2003 | Reynders ............... H04L 45/12 370/254 |
| 2004/0162048 A1 | 8/2004 | Milbar et al. |
| 2004/0253955 A1 | 12/2004 | Love et al. |
| 2004/0255040 A1 | 12/2004 | Lopes et al. |
| 2005/0036487 A1* | 2/2005 | Srikrishna ............... H04L 43/00 370/389 |
| 2005/0250506 A1 | 11/2005 | Beale et al. |
| 2006/0240777 A1 | 10/2006 | Ruuska |
| 2007/0110198 A1 | 5/2007 | Skarby et al. |
| 2007/0160156 A1 | 7/2007 | Melzer et al. |
| 2007/0253496 A1 | 11/2007 | Giannakis et al. |
| 2007/0288618 A1* | 12/2007 | Yeo ....................... H04W 8/005 709/223 |
| 2008/0002723 A1* | 1/2008 | Pusateri ................. H04L 45/00 370/401 |
| 2008/0095223 A1 | 4/2008 | Tong et al. |
| 2009/0029645 A1 | 1/2009 | Leroudier |
| 2009/0052448 A1* | 2/2009 | Ramakrishnan .... H04L 12/1886 370/390 |
| 2009/0073922 A1 | 3/2009 | Malladi et al. |
| 2009/0168915 A1 | 7/2009 | Aoki et al. |
| 2009/0262673 A1 | 10/2009 | Hermersdorf |
| 2010/0002675 A1 | 1/2010 | Fu et al. |
| 2010/0202322 A1* | 8/2010 | Cai ........................ H04W 76/38 370/254 |
| 2011/0039495 A1 | 2/2011 | Sawai et al. |
| 2011/0085513 A1 | 4/2011 | Chen et al. |
| 2011/0096727 A1 | 4/2011 | Bergman et al. |
| 2011/0176445 A1 | 7/2011 | Chen |
| 2011/0305161 A1 | 12/2011 | Ekpenyong et al. |
| 2012/0087276 A1 | 4/2012 | Huang et al. |
| 2012/0327757 A1 | 12/2012 | Wang et al. |
| 2012/0327794 A1 | 12/2012 | Han et al. |
| 2013/0095748 A1 | 4/2013 | Hu et al. |
| 2013/0301628 A1 | 5/2013 | Dacosta et al. |
| 2013/0215844 A1 | 8/2013 | Seol et al. |
| 2013/0242902 A1 | 9/2013 | Liu et al. |
| 2013/0258973 A1 | 10/2013 | Khoshnevis et al. |
| 2013/0336199 A1 | 12/2013 | Schwartz et al. |
| 2013/0337795 A1 | 12/2013 | Falconetti et al. |
| 2014/0010126 A1 | 1/2014 | Sayana et al. |
| 2014/0016534 A1 | 1/2014 | Kim et al. |
| 2014/0044061 A1 | 2/2014 | Yue et al. |
| 2014/0086063 A1 | 3/2014 | Wu |
| 2014/0189155 A1* | 7/2014 | Morris .................. H04L 61/6004 709/238 |
| 2014/0281670 A1* | 9/2014 | Vasseur ................ G06F 11/2002 714/4.11 |
| 2015/0071242 A1 | 3/2015 | Vilaipornsawai et al. |
| 2015/0092695 A1 | 4/2015 | Zhao et al. |
| 2015/0139208 A1 | 5/2015 | Chan et al. |
| 2015/0146655 A1* | 5/2015 | Hui ....................... H04W 40/02 370/329 |
| 2015/0181534 A1 | 6/2015 | Andersson et al. |
| 2015/0188650 A1 | 7/2015 | Au et al. |
| 2015/0245272 A1 | 8/2015 | Lindoff et al. |
| 2015/0282150 A1 | 10/2015 | Nigam et al. |
| 2015/0326422 A1 | 11/2015 | Sagong et al. |
| 2015/0333878 A1 | 11/2015 | Yu et al. |
| 2015/0334643 A1 | 11/2015 | Maaref et al. |

(56) References Cited

U.S. PATENT DOCUMENTS

| | | |
|---|---|---|
| 2015/0341093 A1 | 11/2015 | Kwak et al. |
| 2015/0341100 A1 | 11/2015 | Kwak et al. |
| 2015/0351098 A1 | 12/2015 | Schellmann et al. |
| 2015/0382275 A1 | 12/2015 | Pragada et al. |
| 2016/0006487 A1 | 1/2016 | Ding et al. |
| 2016/0014626 A1 | 1/2016 | Yi et al. |
| 2016/0028520 A1 | 1/2016 | Nogami et al. |
| 2016/0029359 A1 | 1/2016 | Agiwal et al. |
| 2016/0080187 A1 | 3/2016 | Yun et al. |
| 2016/0080961 A1 | 3/2016 | Kim et al. |
| 2016/0080963 A1 | 3/2016 | Marinier et al. |
| 2016/0087694 A1 | 3/2016 | Vilaipornsawai et al. |
| 2016/0088521 A1 | 3/2016 | Ho et al. |
| 2016/0119097 A1 | 4/2016 | Nam et al. |
| 2016/0128028 A1 | 5/2016 | Mallik et al. |
| 2016/0128034 A1 | 5/2016 | Choi et al. |
| 2016/0142117 A1 | 5/2016 | Rahman et al. |
| 2016/0142292 A1 | 5/2016 | Au et al. |
| 2016/0149686 A1 | 5/2016 | Tsai |
| 2016/0154756 A1* | 6/2016 | Dodson ............... G06F 13/4022 710/316 |
| 2016/0183242 A1 | 6/2016 | Cordeiro et al. |
| 2016/0191216 A1 | 6/2016 | Ma et al. |
| 2016/0211999 A1 | 7/2016 | Wild et al. |
| 2016/0233938 A1 | 8/2016 | Mondal et al. |
| 2016/0254889 A1 | 9/2016 | Shattil |
| 2016/0255667 A1 | 9/2016 | Schwartz |
| 2016/0262118 A1 | 9/2016 | Kim et al. |
| 2016/0269135 A1 | 9/2016 | Jiang et al. |
| 2016/0285611 A1 | 9/2016 | Fischer et al. |
| 2016/0294521 A1 | 10/2016 | Au et al. |
| 2016/0301505 A1 | 10/2016 | Furuskog et al. |
| 2016/0352543 A1 | 12/2016 | Hu et al. |
| 2016/0353374 A1 | 12/2016 | Höglund et al. |
| 2016/0353420 A1 | 12/2016 | You et al. |
| 2016/0353453 A1 | 12/2016 | Au et al. |
| 2016/0353475 A1 | 12/2016 | Au et al. |
| 2017/0019847 A1 | 1/2017 | Han et al. |
| 2017/0078054 A1 | 3/2017 | Hadani et al. |
| 2017/0126299 A1 | 5/2017 | Wei et al. |
| 2017/0126458 A1 | 5/2017 | Shattil |
| 2017/0134205 A1 | 5/2017 | Kim et al. |
| 2017/0223700 A1* | 8/2017 | Thubert ............ H04W 72/0413 |
| 2017/0257238 A1 | 9/2017 | Qian et al. |
| 2017/0265119 A1 | 9/2017 | Fang |
| 2017/0272210 A1 | 9/2017 | Zhang |
| 2017/0288928 A1 | 10/2017 | Xu et al. |
| 2017/0367046 A1 | 12/2017 | Papasakellariou |
| 2017/0374558 A1 | 12/2017 | Zhao et al. |
| 2018/0014320 A1 | 1/2018 | Xu et al. |
| 2018/0049236 A1 | 2/2018 | Sun et al. |
| 2018/0062823 A1 | 3/2018 | Hasegawa |
| 2018/0063818 A1 | 3/2018 | Chen et al. |
| 2018/0092095 A1 | 3/2018 | Zeng et al. |

FOREIGN PATENT DOCUMENTS

| | | |
|---|---|---|
| CN | 102647386 A | 8/2012 |
| CN | 103391573 A | 11/2013 |
| CN | 104010343 A | 8/2014 |
| CN | 104168620 A | 11/2014 |
| CN | 104486042 A | 4/2015 |
| EP | 0720316 A1 | 7/1996 |
| EP | 1 998 586 A1 | 12/2008 |
| EP | 2 400 674 A2 | 12/2011 |
| EP | 2 858 408 A1 | 4/2015 |
| EP | 3 065 448 A1 | 9/2016 |
| JP | 2011205679 A | 10/2011 |
| JP | 5373076 B2 | 12/2013 |
| WO | 2005064872 A1 | 7/2005 |
| WO | 2008011717 A1 | 1/2008 |
| WO | 2013081628 A1 | 6/2013 |
| WO | 2013107053 A1 | 7/2013 |
| WO | 2013136777 A1 | 9/2013 |
| WO | 2015095844 A1 | 6/2015 |
| WO | 2015108460 A1 | 7/2015 |
| WO | 2015122665 A1 | 8/2015 |
| WO | 2015140601 A1 | 9/2015 |
| WO | 2015186974 A1 | 12/2015 |
| WO | 2016/023207 A1 | 2/2016 |
| WO | 2016026507 A1 | 2/2016 |
| WO | 2016030300 A1 | 3/2016 |
| WO | 2016065068 A3 | 4/2016 |
| WO | 2016068628 A1 | 5/2016 |
| WO | 2016086971 A1 | 6/2016 |
| WO | 2016105120 A1 | 6/2016 |
| WO | 2016128728 A2 | 8/2016 |
| WO | 2016170389 A1 | 10/2016 |

OTHER PUBLICATIONS

ETRI, "Potential CSI-RS and CSI feedback enhancements for EBF/FD-MIMO" 3GPP TSG RAN WG1 Meeting #19 San Francisco. USA, Nov. 11-21, 2014, 6 pages.

International Search Report and Written Opinion for Application No. PCT/US2017/052581 dated Nov. 24, 2017, 18 pages.

Nokia et al., "On System Design for Multiple Numerologies—Initial Access" 3GPP TSG-RAN WG1 #86, Gothenburg, Sweden, Aug. 22-26, 2016, 6 pages.

International Search Report and Written Opinion for Application No. PCT/US2017/052579, dated Jan. 2, 2018, 16 pages.

Qualcomm: "Forward compatibility considerations on NR Integrated Access and Backhaul", 3GPP Draft; R1-167119 3GPP TSG-RAN WG1 #86 Aug. 22-26, 2016, Gothenburg, Sweden, 5 pages.

CATT: "NR Frame Structure Design" 3GPP Draft R1-166472, 3rd Generation Partnership Project (3GPP), Mobile Competence Centre 650, Route Des Lucioles F-06921 Sophia-Antipolis Cedex France, Aug. 21, 2016, 8 pages.

NTT Docomo et al., "Workplan for Study on NR Access Technology" 3GPP Draft; R1-167373 Work Plan for Nr, 3GPP TSG RAN WG1 Meeting #86, Goteborg, Sweden Aug. 22-26, 2016, 30 pages.

Huawei, HiSilicon, AT&T, Samsung, Qualcomm, Ericsson, ASTRI, [. . . ], "WF on Integrated Backhaul and Access", 3GPP Draft; R1-168429 3GPP TSG RAN WG1 Meeting #86 Gothenburg, Sweden, Aug. 22-26, 2016, 6 pages.

Invitation to Pay Additional Fees and, where Applicable, Protest Fee issued for Application No. PCT/US2017/052578 on Nov. 30, 2017, 18 pages.

Acampora et al., "Control and Quality-of-Service Provisioning in High-Speed Microcellular Networks" IEEE Personal Communications, Second Quarter 1994, pp. 34-43.

Graffi et al., "Monitoring and Management of Structured Peer-to-Peer Systems", IEEE P2P'09—Sep. 9-11, 2009, pp. 311-320.

Mogensen et al. "5G small cell optimized radio design." IEEE. 2013. http://vbn.aau.dk/files/195969578/Globecom_5G_2013_v16emb.pdf, 2013, 7 pages.

Peng et al. "System architecture and key technologies for 5G heterogeneous cloud radio access networks." IEEE network 29.2 (2015): 614. http://arxiv.org/pdf/1412.6677, 20 pages.

Mogensen et al. "Centimeterwave concept for 5G ultradense small cells." 2014 IEEE 79th Vehicular Technology Conference (VTC Spring). IEEE 2014. http://vbn.aau.dk/ws/files/203990574/MWC2020_v5.pdf, 7 pages.

Li et al. ""Energyoptimal scheduling with dynamic channel acquisition in wireless downlinks."" IEEE Transactions on Mobile Computing 9.4 (2010): 527539. http://wwwbcf.usc.edu/~mjneely/pdf_papers/lineelycdc07.pdf, 8 pages.

Huynh et al "Joint Downlink and Uplink Interference Management for Device to Device Communication Underlaying Cellular Networks." Year: 2016 vol. 4 pp. 4420 4430 DOI:10.1109/ACCESS.2016.2603149 IEEE Journals & Magazines. http://ieeexplore.ieee.org/iel7/6287639/7419931/07552542.pdf, 11 pages.

Jungnickel et al. ""The role of small cells coordinated multipoint and massive MIMO in 5G."" IEEE Communications Magazine 52.5 (2014): 44-51. http://nashville.dyndns.org:823/YourFreeLibrary/_lte/Small%20Cells/smallCells1.pdf.

(56) References Cited

OTHER PUBLICATIONS

Nam et al. "Advanced interference management for 5G cellular networks." "IEEE Communications Magazine 52.5 (2014): 52-60. https://www.researchgate.net/protile/Dongwoon_Baipublication/ 262416968_Advanced_Interference_Management_for_5G_Cellular_ Networks2/inks/5515c7890cf2t7d80a3594b5.pdf", 10 pages.

Guvensen et al. "A Generalized Framework on Beamformer Design and CSI Acquisition for Single-Carrier Massive MIMO Systems in Millimeter Wave Channels." arXiv preprint arXiv:1607.01436 (2016). http://arxiv.org/pdf/1607.01436, 47 pages.

Björnson. "Massive MIMO for 5G." Tutorial at 2015 IEEE International Workshop SPAWC Stockholm Sweden Jun. 29, 2015. https://pdfs.semanticscholar.org/85fc/ 19cd9a0090c4e32f5520d8edc86b592f5178.pdf, 58 pages.

Yang et al. "Joint Optimization of Transceiver Matrices for MIMO-Aided Multiuser AF Relay Networks: Improving the QoS in the Presence of CSI Errors." IEEE Transactions on Vehicular Technology 65.3 (2016): 1434-1451. http://eprints.soton.ac.uk/375505/1/ tvt-hanzo-2410759-proof%20(1).pdf, 38 pages.

Yong et al. "A survey of millimeter wave communications (mmWave) for 5G: opportunities and challenges." Wireless Networks 21.8 (2015): 17 pages.

Miao et al. "Self-organized multi-hop millimeter-wave backhaul network: Beam alignment and dynamic routing." Networks and Communications (EuCNC) 2015 European Conference on. IEEE 2015, 5 pages.

Vijayakumar et al. "Review on Routing Algorithms in Wireless Mesh Networks." International Journal of Computer Science and Telecommunications 3.5 (2012): 8792. http://www.ijcst.org/Volume3/ Issue5/p15_3_5.pdf, 6 pages.

Bemmoussat et al. "Efficient routing protocol to support qos in wireless mesh network." International Journal of Wireless & Mobile Networks 4.5 (2012): 89. http://search.proquest.com/openview/ be6898c2de82656d6aa1ae75b947ede0/1?pqorigsite=Gscholar, 16 pages.

Draves et al. "Routing in multiradio multihop wireless mesh networks." Proceedings of the 10th annual international conference on Mobile computing and networking. ACM 2004. http://www.cs.jhu. edu/~cs647/classpapers/ Routing/p114draves. Pdf, 15 pages.

Wazwaz et al. "Medium Access and Routing in Multi Hop Wireless Infrastructures." Univ. of Twente Enschede the Netherlands (2005). https://www.utwente.nl/ewi/dacs/assignments/completed/master/ reports/thesi s_aymanwazwaz.pdf, 91 pages.

Hong, et al. "Applications of selfinterference cancellation in 5G and beyond." IEEE Communications Magazine 52.2 (2014): 114121. http://stevenhong. com/pubs/CommMag145G. pdf, 8 pages.

Hossain. "5G wireless communication systems." American Journal of Engineering Research (AJER) e-ISSN (2013): 2320-0847. http:// www.academia.edu/download/32242528/ZP210344353.pdf, 10 pages.

Osseiran, et al. "Scenarios for 5G mobile and wireless communications: the vision of the METIS project." IEEE Communications Magazine 52.5 (2014): 26-35. https://www.metis2020.com/wp-content/uploads/publications / IEEEComMag_Osseiran_et_al_ METIS_overview_scenarios_201405.pdf, 20 pages.

Hu, et al. "An energy efficient and spectrum efficient wireless heterogeneous network framework for 5G systems." IEEE Communications Magazine 52.5 (2014): 94-101. http://www.academia. edu/download/34030549 / An_Energy_Efficient_and_Spectrum_ Efficient_Wireless_Heterogeneous_Network_Framework_for, 8 pages.

Wu, et al. "Recent advances in energy-efficient networks and their application in 5G systems." IEEE Wireless Communications 22.2 (2015): 145-151. https://www.researchgate.net/profile/Gang_Wu15/ publication /275673965_Recent_advances_in_energyefficient_ networks_and_their_application_in_5G_systems/inks/ 559f3d1508ae03c44a5ce9ac.pdf, 9 pages.

Nakamura, et al. "5G radio access: Requirements, concept and experimental trials." IEICE Transactions on Communications 98.8 (2015): 1397-1406. https://pdfs.semanticscholar.org/68fa/ 40d96cf347627d2a2875777de3de1fb43223.pdf, 10 pages.

Kim, et al., "Interference Management via Sliding-Window Coded Modulation for 5G Cellular Networks." IEEE Communications Magazine, Nov. 2016, pp. 82-89, vol. 54, Issue 11, 8 pages.

Non-Final Office Action received for U.S. Appl. No. 15/432,515 dated Mar. 30, 2018, 48 pages.

Non-Final Office Action dated Apr. 5, 2018 for U.S. Appl. No. 15/376,377, 43 pages.

Non-Final Office Action received for U.S. Appl. No. 15/340,744 dated Apr. 26, 2018, 51 pages.

Non-Final Office Action received for U.S. Appl. No. 15/376,209 dated May 1, 2018, 68 pages.

Non-Final Office Action received for U.S. Appl. No. 15/445,760 dated Apr. 30, 2018, 47 pages.

International Search Report and Written Opinion received for PCT Application No. PCT/US2017/052578 dated Jan. 22, 2018, 20 pages.

Notice of Allowance received for U.S. Appl. No. 15/445,760 dated Sep. 24, 2018, 29 pages.

\* cited by examiner

FACILITATION OF ROUTE OPTIMIZATION FOR A 5G NETWORK OR OTHER NEXT GENERATION NETWORK

CROSS-REFERENCE TO RELATED APPLICATION

This application is a U.S. Non-Provisional patent application that claims the benefit of priority to U.S. Provisional Patent Application No. 62/401,878, filed Sep. 29, 2016 and titled "FACILITATION OF ROUTE OPTIMIZATION," the entirety of which application is incorporated herein by reference.

TECHNICAL FIELD

This disclosure relates generally to facilitating route selection and optimization in a hierarchical mesh network. More specifically, this disclosure relates to 5G multi-hop relay mesh networks or other next generation networks.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption and lower latency than 4G equipment.

A mesh network is a network topology in which each node relays data for the network. Mesh networks can relay messages using either a flooding technique or a routing technique. With routing, the message is propagated along a path by hopping from node to node until it reaches its destination. To ensure all its paths' availability, the network can allow for continuous connections and can reconfigure itself around broken paths, using self-healing algorithms such as shortest path bridging. Self-healing allows a routing-based network to operate when a node breaks down or when a connection becomes unreliable. As a result, the network is typically quite reliable, as there is often more than one path between a source and a destination in the network. Mesh networks can be used in wireless networks, wired networks, and for software interaction.

The above-described background relating to a mesh networks is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
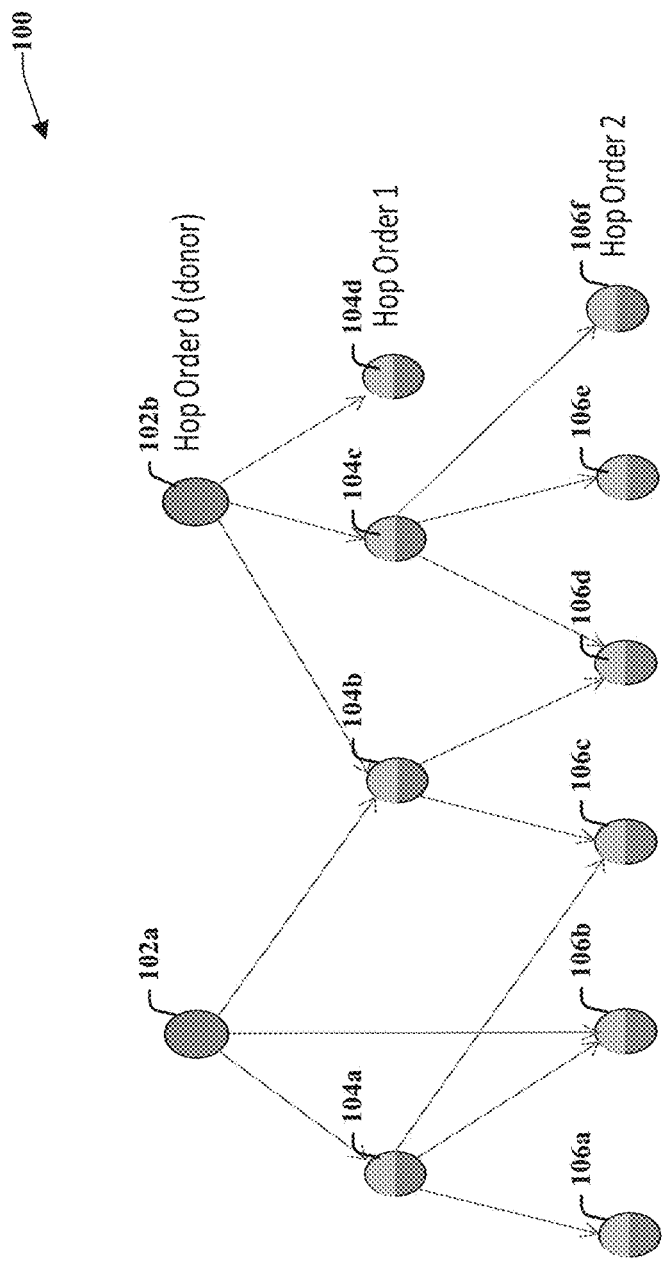
FIG. 1 illustrates an example wireless network comprising various order node devices according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate mesh network optimization for 5G networks or other next generation networks.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate mesh network optimization. Facilitating mesh network optimization can be implemented in connection with any type of device with a connection to the communications network such as: a mobile handset, a computer, a handheld device, or the like.

In the context of multi-hop mesh networks, millimeter wave mesh networks can have a hierarchy. Unlike ad hoc networks, which use contention/collision based transmission, in a hierarchical mesh network a scheduling hierarchy can be established, which makes scheduling-based transmissions possible. Because a hierarchical mesh network in millimeter wave (mmWave) wave network can require a fast route switching at time scales less than handover time scales, a media access control (MAC) level switching mechanism can be built within a network design to facilitate fast route updates. A multi-hop self-backhauling architecture can comprise a backhaul (in-band or out-of-band) access integrated and multiplexed in a scheduler to allow for ultra-dense deployment of mmWave transmission points without having to densify the transport proportionately. A phased array access and the backhaul can use the same radio. A relay design can reuse access physical channels and higher layer protocols with optimizations.

Multi-hop relay topology management can comprise long time scales, management of static hop order, initial access, and change every time a node is added and/or removed. However the route management can happen over 10 seconds or 100 seconds of sub frames and routes can be updated for load variance and blocking. Additionally the multi-hop relay can comprise frame structure optimization (downlink, uplink, downlink+uplink) at every node and schedule backhaul and access traffic.

Assuming that a topology of a hierarchical network is known, a hop order can be determined. The hop order can be an indicator of how many hops away a given relay node is from a donor node. Additionally, it should be noted that the hop order hierarchy can comprise any number of N hops and in any order (e.g., 0, 1, 2; 1, 2, 3; 0, 1, 2, . . . N). Once the topology of the network is known, each relay node can maintain connection with a finite number of relay nodes of a lower hop order. In this context, maintaining a connection implies sharing channel state information, load information, queue length/delay information etc. The route selection optimization can begin with a relay node of the highest hop order and propagate towards relay nodes of a lower hop order. As the system traverses each hop order, the number of possible routes can increase by a number K, where K is the number of connections each relay node maintains with relay nodes of a lower hop order. In a typical network, K can be 3 or 4. However, the number of routes can increase exponentially. The system can also maintain L routes, where L is a subset of K and where L is defined in relation to a metric of the route. The metric of a route can be calculated. For instance, typically L can be a finite number so the number of routes stays constant as the system traverses down the hop order. Once a donor level is reached, L routes can be chosen for each end point.

A utility metric can be associated with each hop (an edge of a graph) and another utility metric can be associated with a route (a combination of the edges of the graph).

$$\text{metric of a hop: } \mu_{i,j} = r_{i,j}\frac{\rho_i}{\rho_j} \quad \text{Equation (1)}$$

$$\text{metric of route: } v(i, j, k) = f(\mu(i, j), \mu(j, k)), \quad \text{Equation (2)}$$

where $i \in X_n$, $j \in X_{n-1}$, and $k \in X_{n-2}$. The metric can comprise aspects of a link and nodes such as channel state information (CSI), load indicators, buffer status, delays, capability of donor nodes, etc. The metric of the route can be rewritten as:

$$f(f(\mu_1,\mu_2),\mu_3) = f(\mu_1, f(\mu_2,\mu_3)) \quad \text{Equation (3):}$$

$$v(i,j,k) = \mu_{i,j} \bigcirc \mu_{j,k} \quad \text{Equation (4):}$$

The metric of a hop (i.e. graph edge) can depend on the CSI of the link load (e.g., wideband CQI) on user the equipment side of the link (e.g., volume of traffic, where more load on the user equipment side can result in a larger metric), and/or the load on the access side of the link (e.g., volume of traffic and number of other nodes passing through, where more load on the access side can result in a smaller metric).

Additionally, the route can be updated. For instance, a full update can comprise the previously described method. However a second quick update method can perform route selection by updating the metric of the best L routes. The metric of a route can depend on various factors, which are dynamic. Therefore, it is possible for the metrics of the route to change. Quickly updating the metric can allow the system the ability to change routes in short time periods without the problem becoming non-scalable. A distributed algorithm can achieve the route optimization and selection. For instance, if a central entity performs the route optimization algorithm, then information about each relay node connection can flow to the central entity, and for a large network, the central entity would receive too much information to process the information efficiently. Alternatively, instead of all information flowing to a central node, a select and pass concept can be utilized. In the select and pass concept, each node at the highest hop order can send the route metric to the L connections at the hop order below it. Then each of the nodes at the lower hop order that receives the route metric information can then compute the L*K possible routes to another hop order below it. The system can then choose the best L out of possible K*L routes and forward those to the hop order below it. Consequently, only the information about the surviving routes flow down to the donor level, thereby increasing efficiency and scalability of the mesh network.

In one embodiment, described herein is a method comprising determining, by a wireless network device comprising a processor, a topology of network devices of a wireless network, wherein the network devices comprise first order node devices and second order node devices, and wherein the second order node devices have a higher order than the first order node devices. The method also comprises determining, by the wireless network device, a number of the second order node devices in communication with the first order node devices, wherein the communication results in wireless connections between the number of the second order node devices and the first order node devices. Furthermore, the method comprises, based on a quality metric associated with a wireless network performance of the network devices of the wireless network, terminating, by the wireless network device, a wireless connection of the wireless connections.

According to another embodiment, a system can facilitate, determining a topology of a wireless network comprising first order node devices, second order node devices of a first different order than the first order node devices, and third order node devices of a second different order than the first order node devices and the second order node devices. The system can determine a first number of the second order node devices connected, via first connections, to the third order node devices, and based on a first quality metric associated with the connections, the system can send first route metrics, representative of first relay hop paths, to the first number of the second order node devices. Additionally, the system can determine a second number of the first order node devices connected, via second connections, to the first number of the second order node devices, and based on a second quality metric associated with the second connections, the system can determine a second route metric, representative of second relay hop paths, between the second number of the first order node devices and the first number of the second order node devices. Furthermore, based on the first route metric and the second route metric, the system can generate, by the first number of the second order node devices, a third route metric representative of third routes.

According to yet another embodiment, described herein is a machine-readable storage medium that can perform the operations comprising determining a topology of a wireless network comprising first order node devices, second order node devices, and third order node devices. The machine-readable storage medium can determine a first number of the second order node devices, wherein the first number of the second order node devices are connected to the third order node devices, via a first wireless connection. Based on a quality metric associated with the first wireless connection, the machine-readable storage medium can determine a second number of the second order node devices. Additionally, in response to determining the second number, the machine-readable storage medium can facilitate sending a first route metric, representative of a first relay path, to the second number of the second order node devices; and the machine-readable storage medium can facilitate determining a third number of the first order node devices, wherein the third number of the first order node devices are connected to the second number of the second order node devices, via a second wireless connection. Based on a second quality metric associated with the second wireless connection, the machine-readable storage medium can determine a fourth number of the first order node devices; and the machine-readable storage medium can determine a second route metric, representative of a second relay path, between the second number of the second order node devices and the fourth number of the first order node devices. Furthermore, based on the first route metric and the second route metric, the machine-readable storage medium can facilitate generating, by the second number of the second order node devices, a third route metric representative of third routes.

These and other embodiments or implementations are described in more detail below with reference to the drawings.

Referring now to FIG. 1, illustrated is an example wireless network comprising various order node devices according to one or more embodiments. A node can be a relay node or a donor node. The hop order of the node (node order) indicates the number of hops it is away from a donor node. For instance, in system 100, node 102a is one hop away from node 104a. When a node is connected to nodes of different hop orders, the highest order should be considered. Each node can possibly connect to multiple nodes in different orders. For example, node 104b, of hop order 1, can connect to node 102a, of hope order 0, and node 106d, of hop order 2. An end node can be defined as a node, which does not have any other node to hop to and/or a node where all routes are terminated. By definition all nodes of the highest hop order are end nodes (e.g., node 106a), however, some of the nodes of other hop orders might also be end nodes if no other nodes of a higher hop order can connect to it (e.g., node 104b). Even though nodes of a higher hop order can connect to it, during route selection no other node of higher hop order chooses to hop to it (e.g., node 104b). These nodes can be considered to be secondary end nodes.

Figure 2:
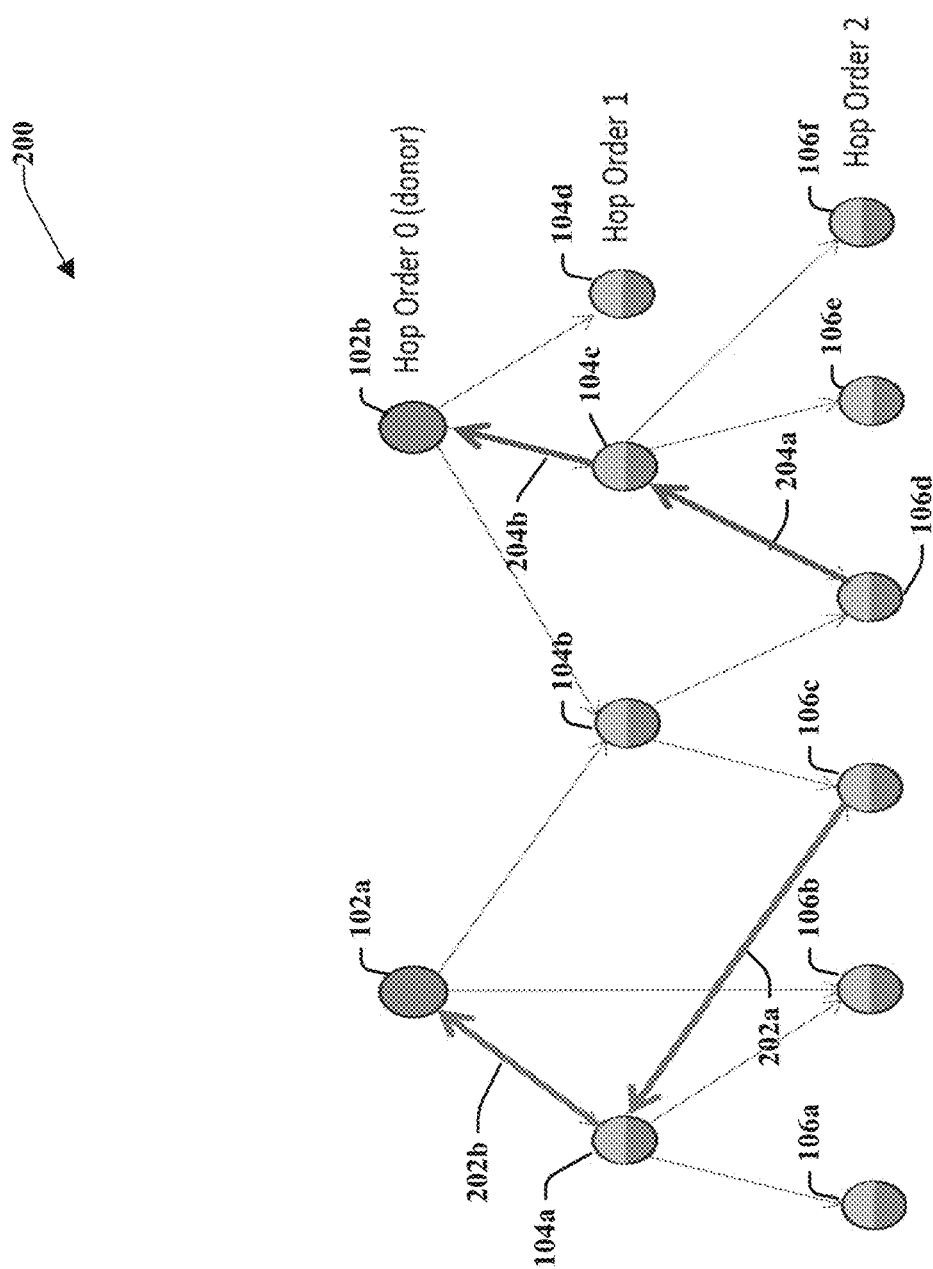
FIG. 2 illustrates an example wireless network comprising various order node devices and end node devices according to one or more embodiments.

Referring now to FIG. 2, illustrated is an example wireless network comprising various order node devices and end node devices according to one or more embodiments. In system 200, route optimization can begin from the nodes of the highest hop order where all the nodes are end nodes 106a, 106b, 106c, 106d, 106e, 106f. The route optimization can progressively work towards lower hop order 0 by choosing multiple paths (202a, 202b, 204a, 204b) from the higher hop order 2. At each order, only L best routes (202a, 202b, 204a, 204b) from each end node 106a, 106b, 106c, 106d, 106e, 106f of higher order survive based on the routes with the highest metric and the remaining routes and/or nodes can be killed 106a, 106b, 104b, 106e, 106f, 104d. At each order, the after survivors (104a, 104c, 102a, 102b) can process routes from higher orders so that new end nodes can be added.

Figure 3:
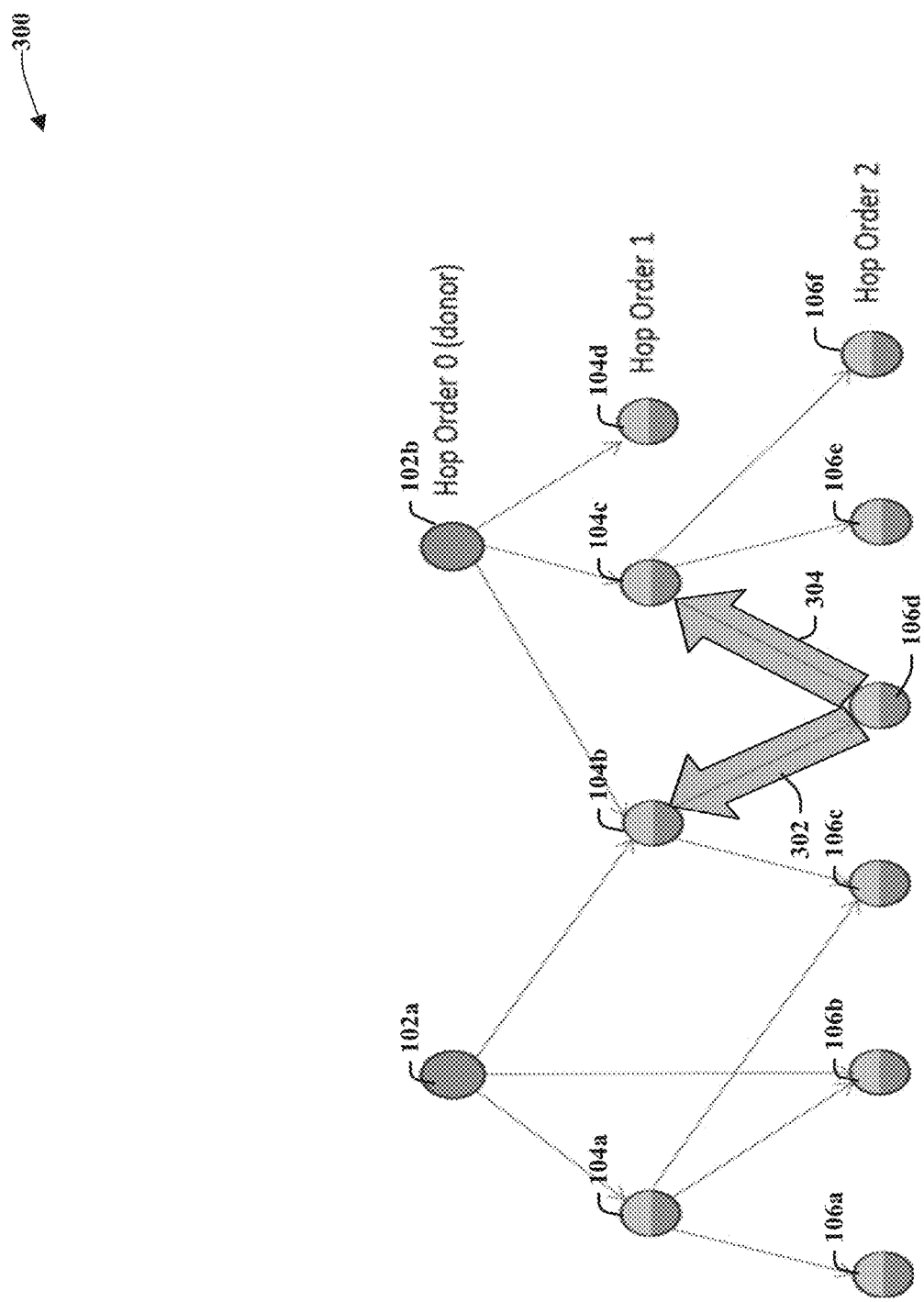
FIG. 3 illustrates an example wireless network performing a route optimization according to one or more embodiments.

Referring now to FIG. 3, illustrated is an example wireless network performing a route optimization according to one or more embodiments. In system 300, the edges can be initialized and the metric for each edge can be computed via Equation 4 above, where $\mu_{i,j}$ 302 $\bigcirc \mu_{j,k}$ 304. Beginning with the highest hop order 'N' (e.g., hop order 2) where all the nodes are end nodes, for each node of this order the L best routes can be selected of the possible K edges. Therefore, the total number of routes can be generated from Equation (5) below:

$$R_n = \text{card}(X_n) \cdot L, \text{ where card indicates the cardinality of set } X_n \quad \text{Equation (5):}$$

Figure 4:
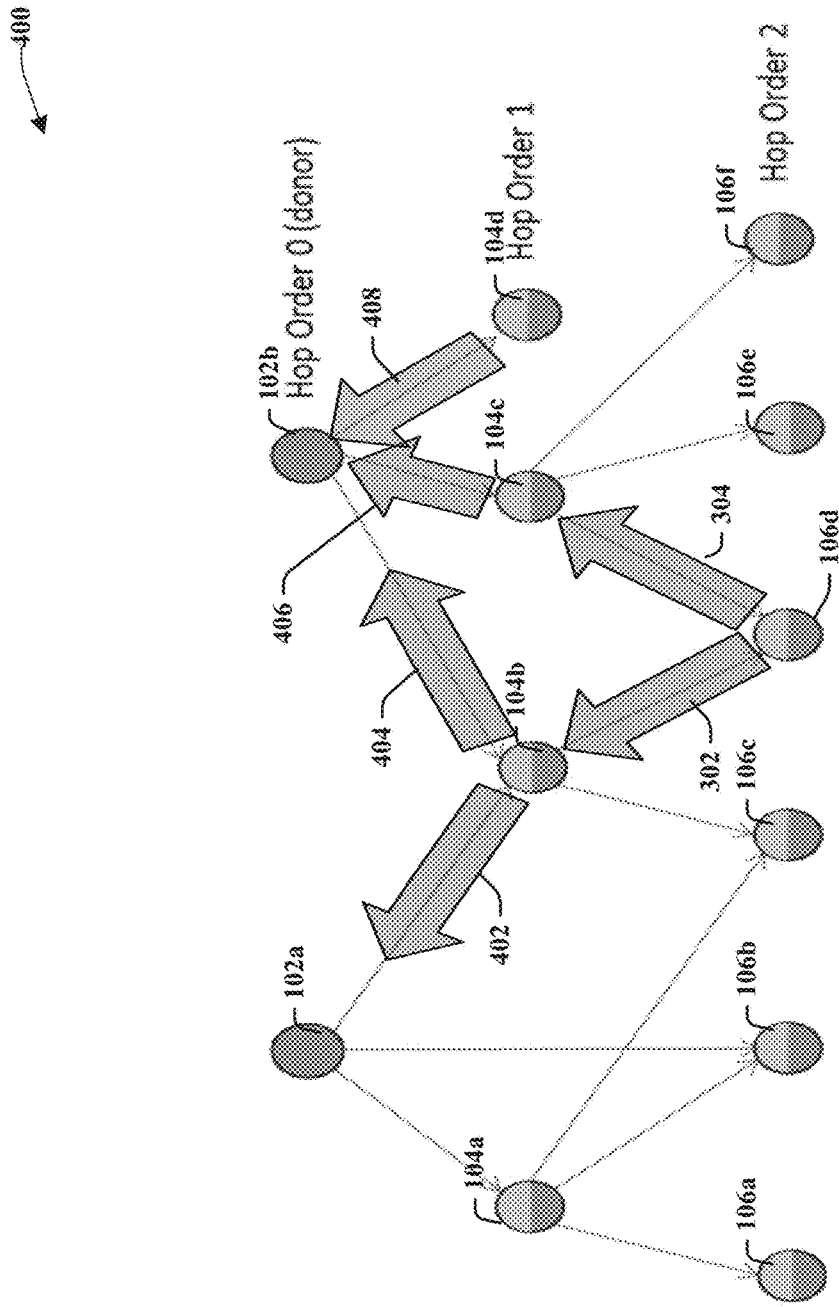
FIG. 4 illustrates an example wireless network performing a route optimization according to one or more embodiments.

Referring now to FIG. 4, illustrated is an example wireless network performing a route optimization according to one or more embodiments. In system 400, for each of the surviving $R_n$ routes, routes 402, 404, 406 for the next hop can be created. There can be a maximum of $L \times R_n$ such routes. Next, the route metric for each of these routes can be computed as indicated earlier. The L routes with the highest route metric from each end node can be kept. After keeping the best L routes from the end nodes of the previous step, new end nodes plus secondary end nodes 104d from this hop order (hop order 1) can be identified. Next, the metric for all possible routes originating from these nodes, as indicated previously, can be computed. Then, the hop order can be decremented by 1 and the system 400 steps can be repeated until the hop order 0 is reached.

Figure 5:
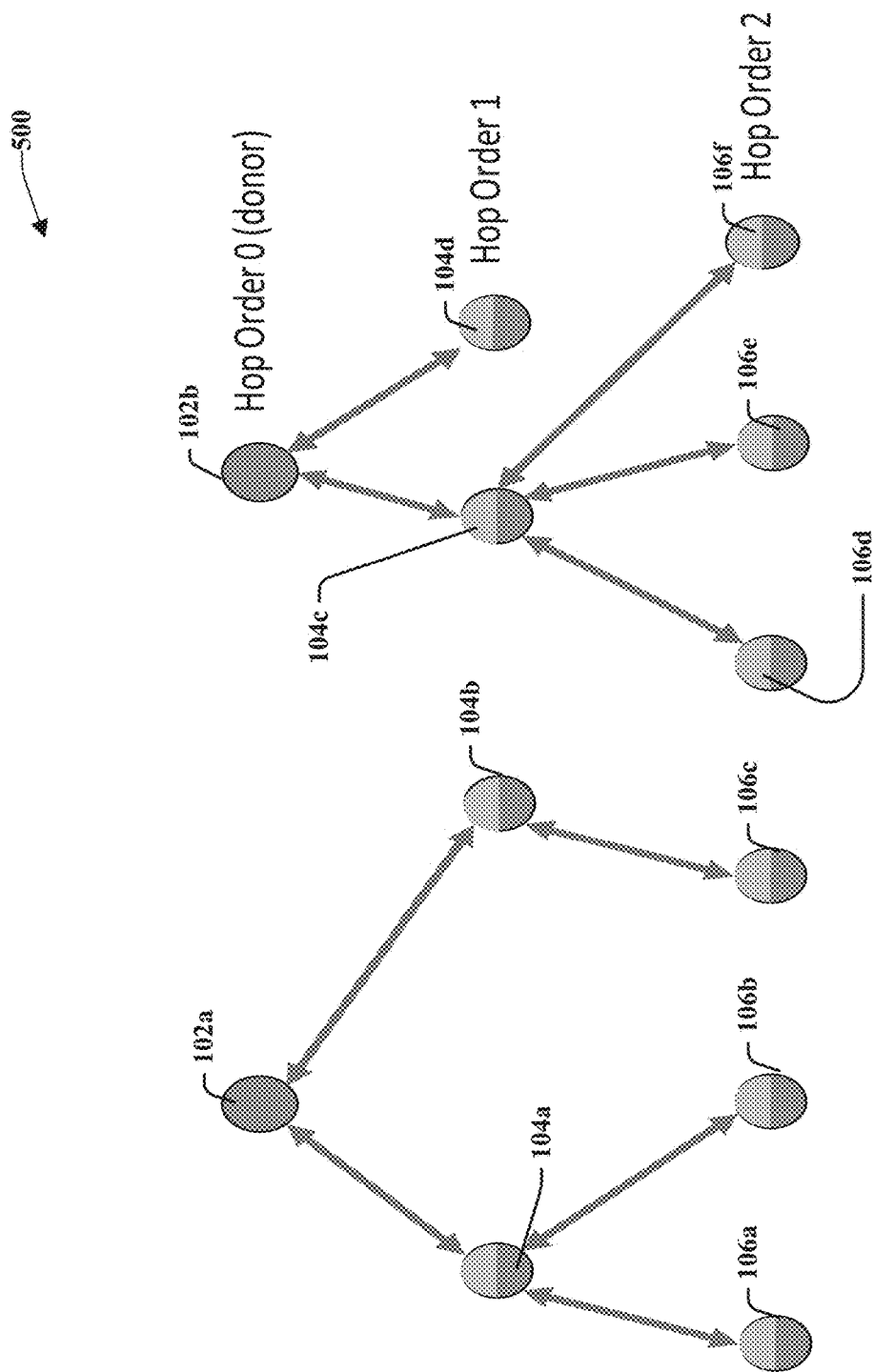
FIG. 5 illustrates an example wireless network performing a unique route selection according to one or more embodiments.

Referring now to FIG. 5, illustrated is an example wireless network performing a unique route selection according to one or more embodiments. In system 500, once the hop order 0 is reached (donor level), then the maximum of L routes per end node 106a, 106b, 106c, 106d, 106e, 106f (regular and secondary end nodes 104d) can be provided. For the non-edge nodes there can be a maximum of L routes, which are part of the routes to some end nodes. Of the surviving routes to each end node, the one with the highest route metric can be selected to become the chosen route for the given end node. After this is performed for each end node, the route to non-end nodes can be a part of the routes to the end nodes (connected to them), yielding only one surviving route to the non-end nodes. Thus, providing unique routes to each node.

Figure 6:
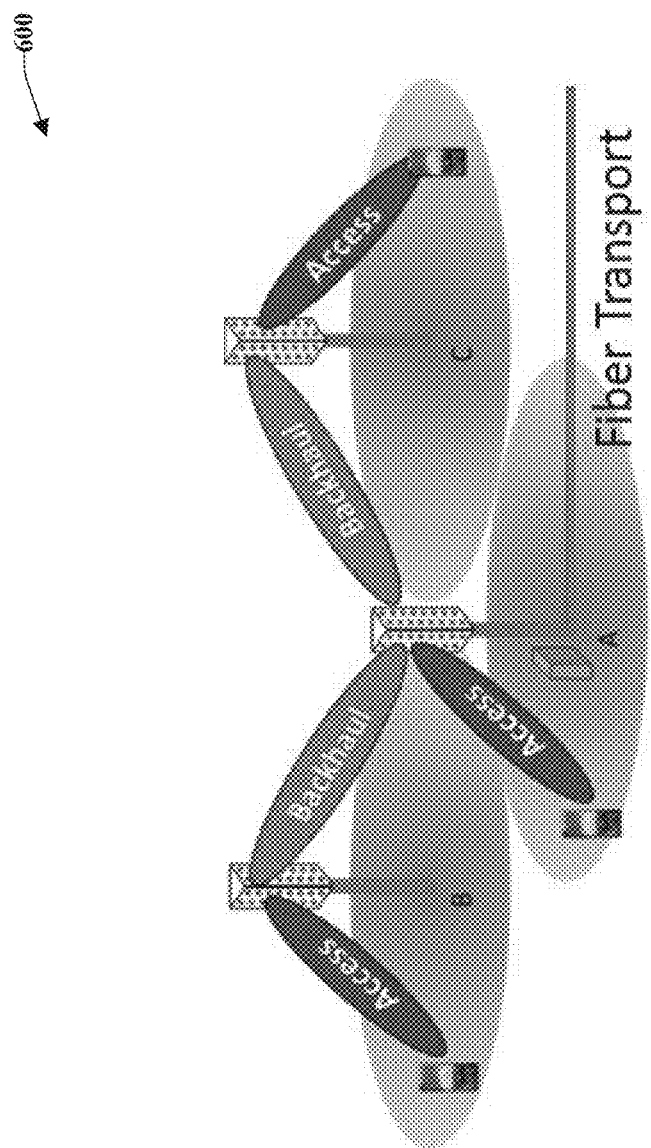
FIG. 6 illustrates an example wireless network multi-hop self-backhauling architecture according to one or more embodiments.

Referring now to FIG. 6, illustrated is an example wireless network multi-hop self-backhauling architecture according to one or more embodiments. The example wireless network multi-hop self-backhauling architecture 600 can have backhaul (in-band or out of band) and access integrated and multiplexed in a scheduler. This architecture can allow for ultra-dense deployment of mmWave transmission protocol (TP) without having to densify a transport proportionately. Due to usage of phased array access and backhaul can the multi-hop self-backhauling architecture 600 can use the same radio (unlike cellular bands which require separate radios). There is also no need for full duplex interference cancellation.

Figure 7:
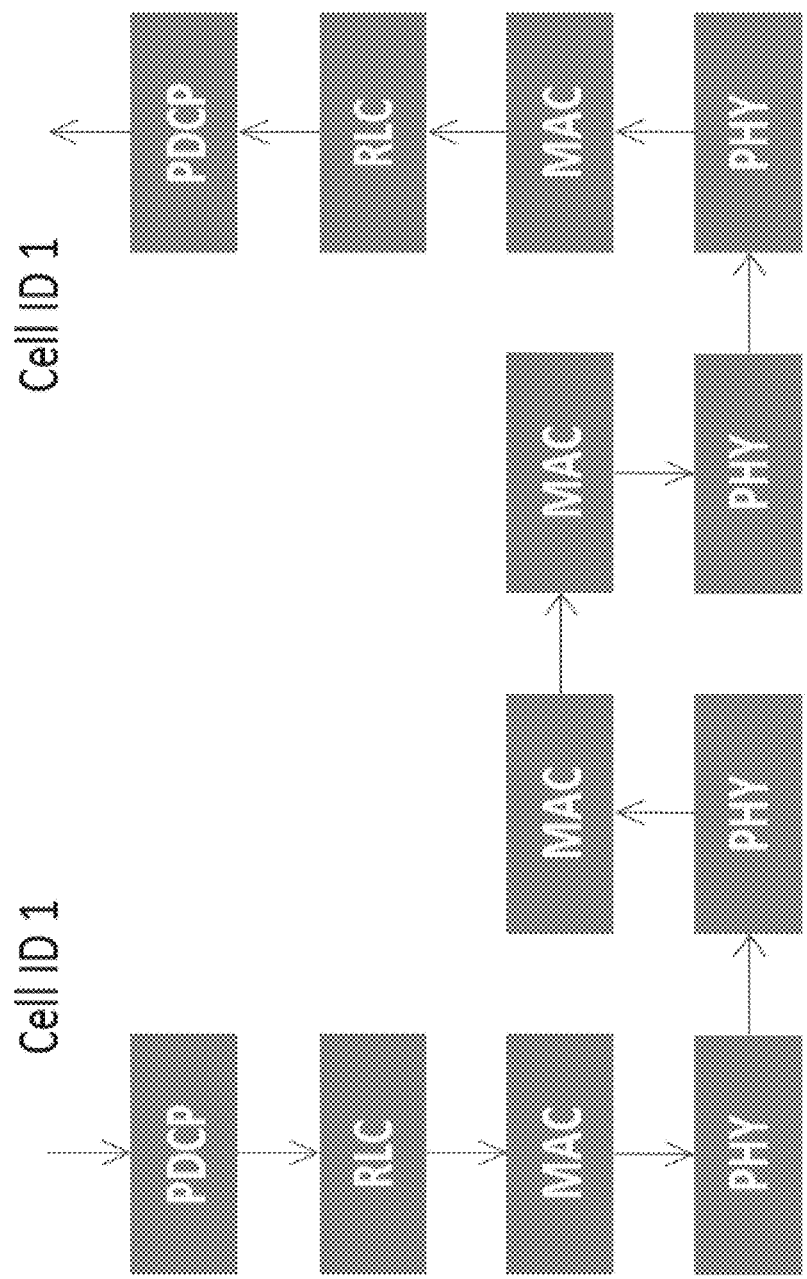
FIG. 7 illustrates an example schematic system block diagram for a layer-2 relay according to one or more embodiments.

Referring now to FIG. 7, illustrated is an example schematic system block diagram for a layer-2 relay according to one or more embodiments. The layer-2 relay in FIG. 7 depicts a shared cell identification. The layer-2 relay can also perform fast TP switching (route switching) by enabling this functionality in the scheduler. This design can be suitable for mmWave since it can allow for fast media access control (MAC) level switching to mitigate blocking. LTE Rel-10 based relays do not work for mmWave and L3 relays do not allow for fast TP switching since the backhaul switching is a handover. Therefore to enable fast TP switching and mitigate short term blocking an L2 relay with switching enabled in the MAC/physical (PHY) layer can be used. As depicted in FIG. 7, fast TP switching can be enabled at the MAC and PHY layers instead of between the radio link control layer (RLC) and packet data convergence protocol (PDCP) layers.

In a Rel-10 relay, the scheduling, when done at a given node can only take into account the channel state information of the given hop. There is no visibility into the scheduler on the links 'down the road' for the given route. New radios (NR) should provide different architecture and resource allocation options for supporting L2 (MAC-level switching) relays with multi-hop scheduling and multi-connectivity functionalities.

Figure 8:
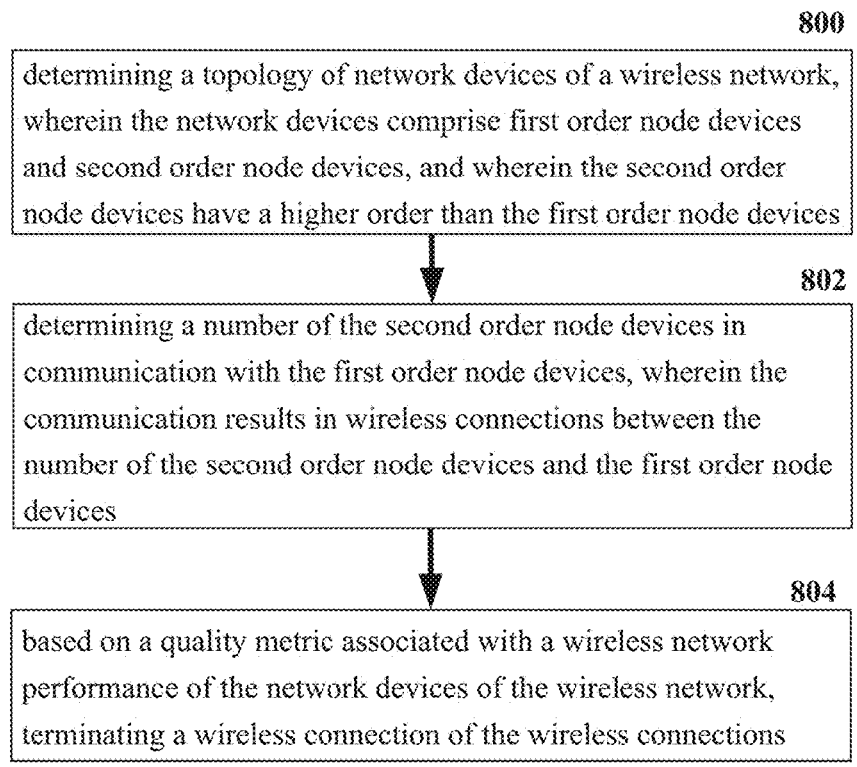
FIG. 8 illustrates an example schematic system block diagram for a multi-hop order route optimization according to one or more embodiments.

Referring now to FIG. 8, illustrated is an example schematic system block diagram for a multi-hop order route optimization according to one or more embodiments. At element 800, a method can determine a topology of network devices of a wireless network, wherein the network devices comprise first order node devices (e.g., 102a and 102b) and second order node devices (e.g., 104a, 104b, 104c, and 104d) having a higher order than the first order node devices, and wherein the second order node devices have a higher order than the first order node devices. The method can also determine a number of the second order node devices (e.g., 104a, and 104b) in communication with the first order node devices (e.g., 102a and 102b), wherein the communication results in wireless connections between the number of the second order node devices (e.g., 104a, and 104b) and the first order node devices (e.g., 102a and 102b) at element 802. Consequently, based on a quality metric associated with a wireless network performance of the network devices of the wireless network, the method can comprise terminating, a wireless connection of the wireless connections (e.g., 104c, and 104d) at element 804.

Figure 9:
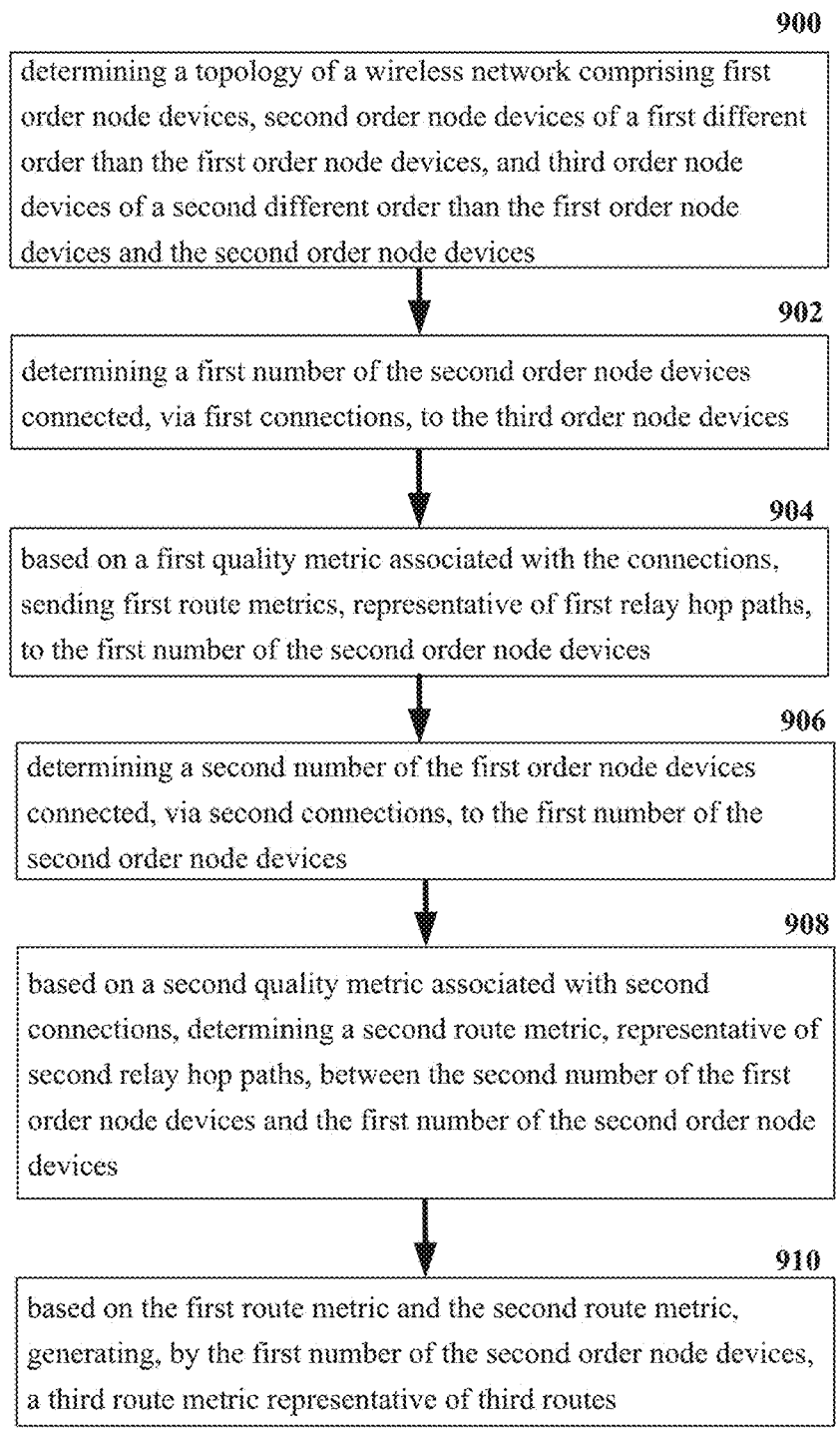
FIG. 9 illustrates an example schematic system block diagram for a multi-hop order route optimization according to one or more embodiments.

Referring now to FIG. 9, illustrated is an example schematic system block diagram for a multi-hop order route optimization according to one or more embodiments. At element 900, a system can comprise determining a topology of a wireless network comprising first order node devices (e.g., 102a and 102b), second order node devices (e.g., 104a, 104b, 104c, and 104d), of a first different order than the first order node devices and third order node devices (e.g., 106a, 106b, 106c, 106d, 106e, and 106f) of a second different order than the first order node devices and the second order node devices. The system can facilitate determining a first number of the second order node devices connected (e.g., 104a, 104b, and 104c), via first connections, to the third order node devices (e.g., 106a, 106b, 106c, 106d, 106e, and 106f) at element 902. Based on a first quality metric associated with the connections, the system can facilitate sending first route metrics, representative of first relay hop paths (e.g., 202a, and 204a), to the first number of the second order node devices (e.g., 104a, 104b, and 104c) at element 904.

Additionally at element 906, the system can determine a second number of the first order node devices connected (e.g., 102a and 102b), via second connections (e.g., 202b and 204b), to the first number of the second order node devices (e.g., 104a, 104b, and 104c). Based on a second quality metric associated with the second connections (e.g., 202b and 204b), determining a second route metric, representative of second relay hop paths, between the second number of the first order node devices (e.g., 102a and 102b) and the first number of the second order node devices (e.g., 104a, 104b, and 104c) at element 908. Furthermore, based on the first route metric and the second route metric, the system can facilitate generating, by the first number of the second order node devices (e.g., 104a, 104b, and 104c), a third route metric representative of third routes at element 910.

Figure 10:
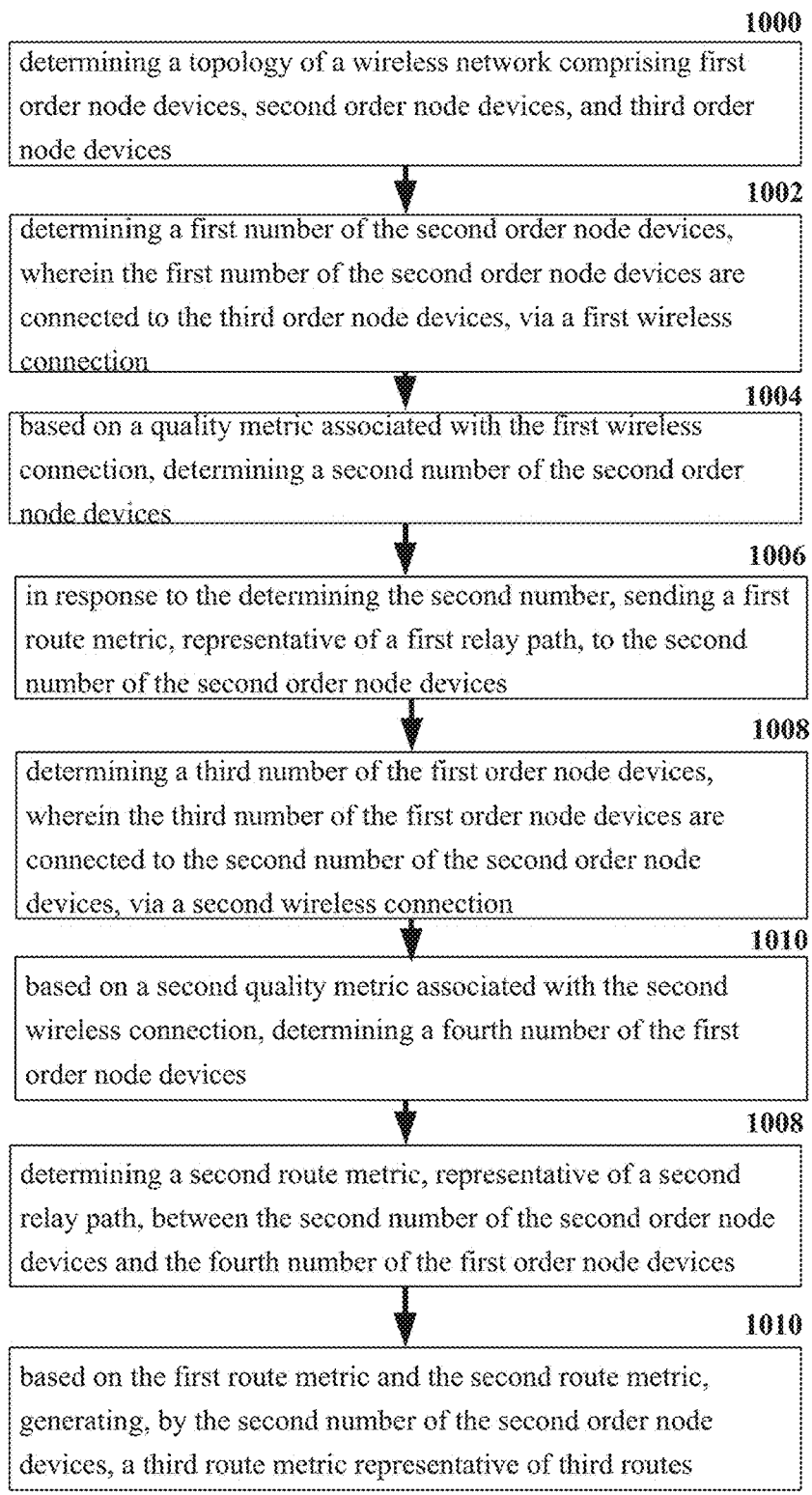
FIG. 10 illustrates an example schematic system block diagram for a multi-hop order route optimization according to one or more embodiments.

Referring now to FIG. 10, illustrated is an example schematic system block diagram for a multi-hop order route optimization according to one or more embodiments. At element 1000 a machine-readable storage medium can facilitate determining a topology of a wireless network comprising first order node devices (e.g., 102a and 102b), second order node devices (e.g., 104a, 104b, 104c, and 104d), and third order node devices (e.g., 106a, 106b, 106c, 106d, 106e, and 106f). At element 1002, the machine-readable storage medium can facilitate determining a first number of the second order node devices (e.g., 104a, 104b, and 104c), wherein the first number of the second order node devices (e.g., 104a, 104b, and 104c) are connected to the third order node devices (e.g., 106a, 106b, 106c, 106d, 106e, and 106f), via a first wireless connection. Based on a quality metric associated with the first wireless connection, the machine-readable storage medium can facilitate determining a second number of the second order node devices (e.g., 104b, and 104c) at element 1004.

In response to the determining the second number, sending a first route metric, representative of a first relay path (e.g., 302, 304), to the second number of the second order node devices (e.g., 104b, and 104c) at element 1006. At element 1008, the machine-readable storage medium can also determine a third number of the first order node devices (e.g., 102a and 102b), wherein the third number of the first order node devices (e.g., 102a and 102b) are connected to the second number of the second order node devices (e.g., 104b, and 104c), via a second wireless connection. Based on a second quality metric associated with the second wireless connection, the machine-readable storage medium can determine a fourth number of the first order node devices (e.g., 102a and 102b) at element 1010 and determine a second route metric, representative of a second relay path (e.g., 402, 404, and 406), between the second number of the second order node devices (e.g., 104b, and 104c) and the fourth number of the first order node devices (e.g., 102a and 102b). Furthermore, based on the first route metric and the second route metric, the machine-readable storage medium can facilitate generating, by the second number of the second order node devices (e.g., 104b, and 104c), a third route metric representative of third routes at element 1012.

Figure 11:
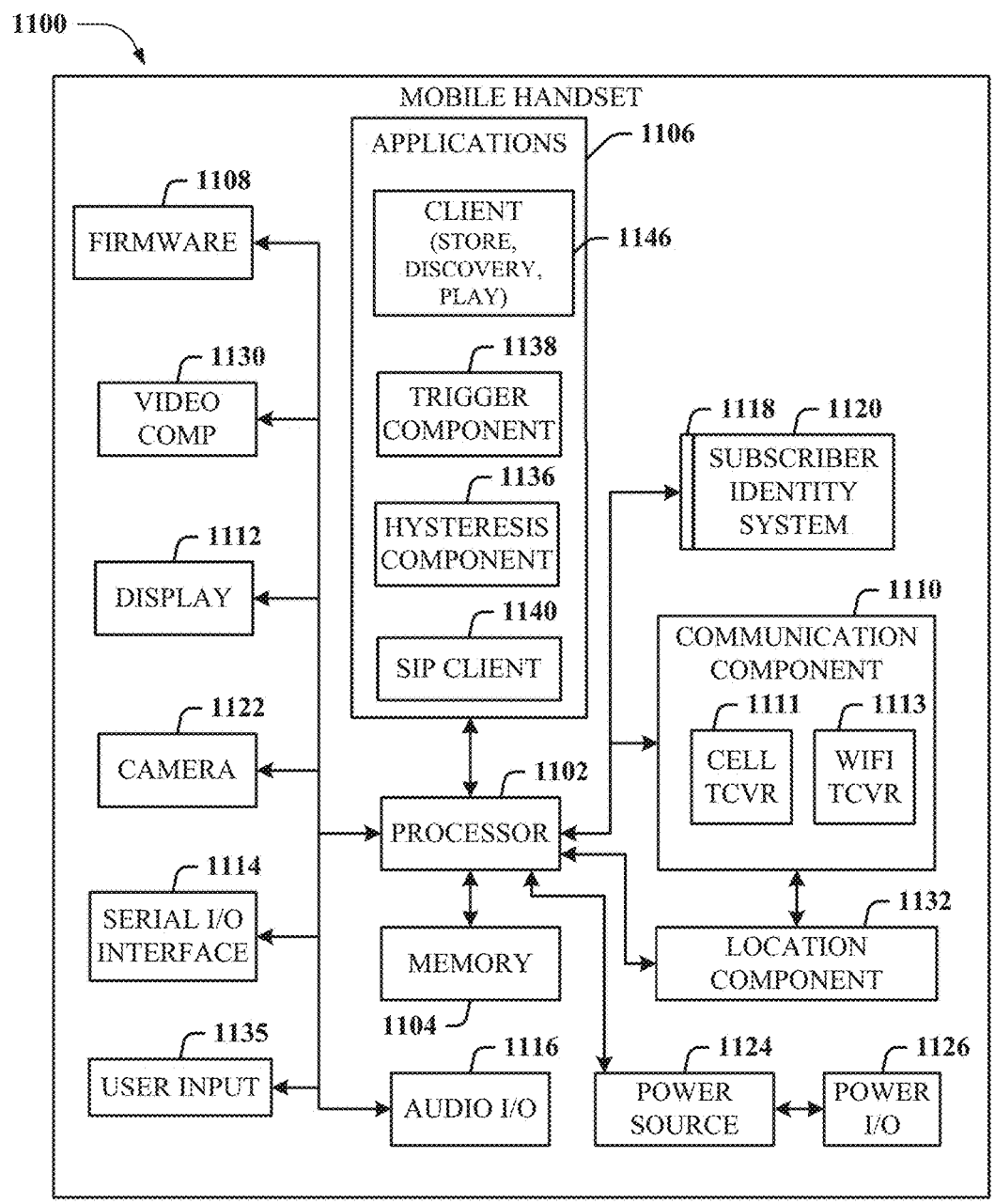
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, main-frame computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
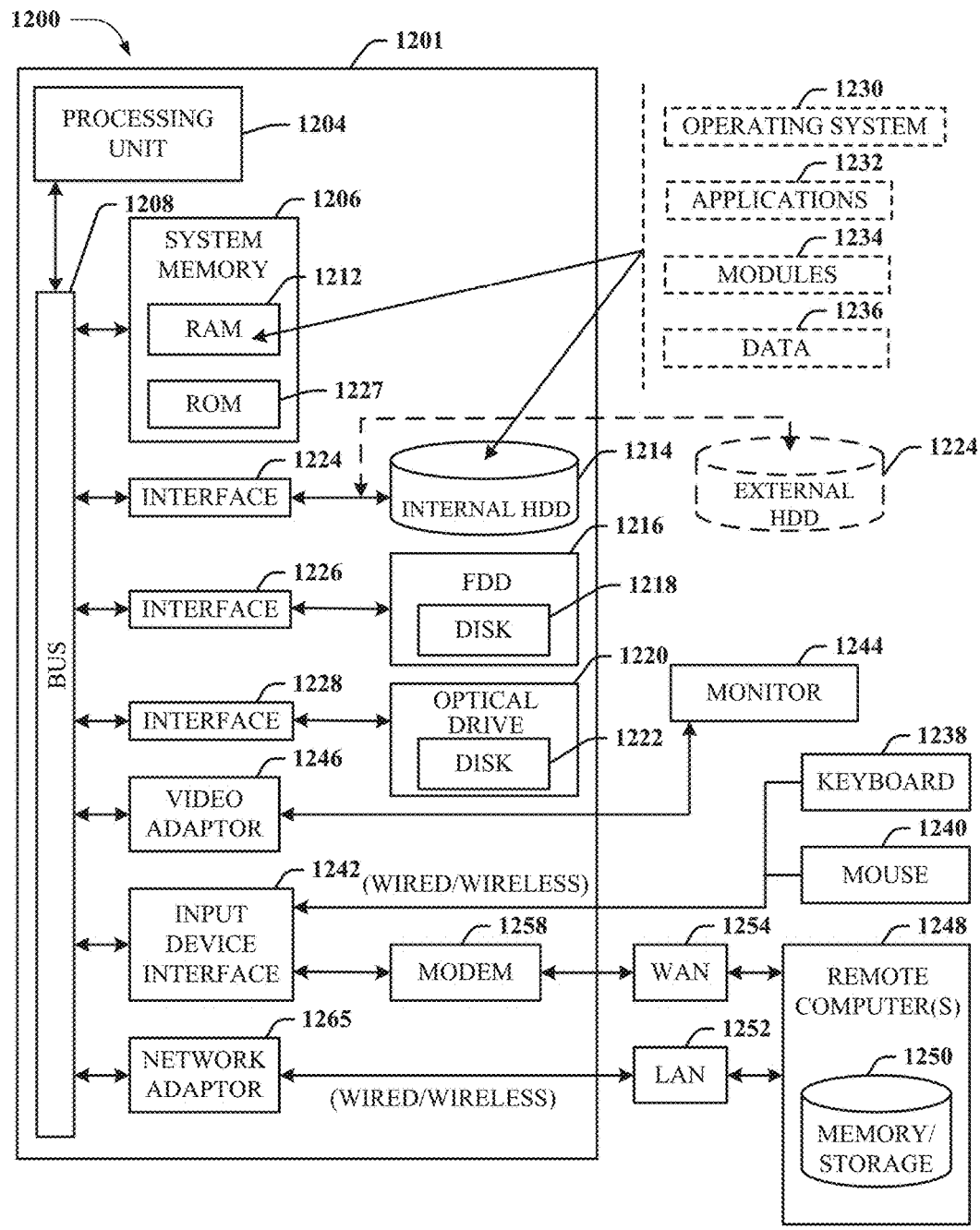
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Multi-hop relay net working with integrated access and backhaul are a technology component to achieve ultra dense networks in 5G. This disclosure provides a framework for route selection and optimization in a hierarchical mesh network. Unlike wireline route selection in the case of mmWave networks, the route selection mechanism must be such that it will allow for fast route switching even in the order of 10 s of milliseconds to mitigate the effects of channel impairments such as blocking.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    determining, by a wireless network device comprising a processor, a topology of network devices of a wireless network, wherein the network devices comprise a first number of first order node devices, second order node devices, and third order node devices, and wherein the second order node devices have a higher order than the first order node devices;
    determining, by the wireless network device, a first number of the second order node devices in communication with the third order node devices, wherein the communication results in first wireless connections between the first number of the second order node devices and the third order node devices; and
    based on a first quality metric associated with a wireless network performance of the network devices of the wireless network, sending, by the wireless network device, a first route metric, representative of a first relay hop path, to the first number of the second order node devices;
    determining by the wireless network device, a second number of the first order node devices connected, via second communications, to the first number of the second order node devices; and
    based on the first route metric and a second route metric, representative of a second relay hop path, between the second number of the first order node devices and the first number of the second order node devices, generating, by the wireless network device, a third route metric representative of third routes.

2. The method of claim 1, further comprising:
    in response to a condition associated with the first order node devices being determined to have been satisfied, updating, by the wireless device, quality metric data associated with the first quality metric.

3. The method of claim 2, wherein the connection is a terminated connection, and wherein the updating comprises updating the first quality metric data associated with a non-terminated connection of the connections.

4. The method of claim 3, wherein the first quality metric data comprises channel state data representative of a channel state of the non-terminated connection.

5. The method of claim 3, wherein the first quality metric data comprises load data representative of a load of the non-terminated connection.

6. The method of claim 3, wherein the first quality metric data comprises delay data representative of a packet transmission delay associated with the non-terminated connection.

7. The method of claim 1, wherein the connection is a first connection, and further comprising:
    based on the first quality metric associated with the wireless network performance of the network devices of the wireless network, maintaining, by the wireless network device, a second connection of the connections.

8. A system, comprising:
    a processor; and
    a memory that stores executable instructions that, when executed by the processor, facilitate performance of operations, comprising:
        determining a topology of a wireless network comprising first order node devices, second order node devices of a first different order than the first order node devices, and third order node devices of a second different order than the first order node devices and the second order node devices;
        determining a first number of the second order node devices connected, via first connections, to the third order node devices;
        based on a first quality metric associated with the connections, sending first route metrics, representative of first relay hop paths, to the first number of the second order node devices;
        determining a second number of the first order node devices connected, via second connections, to the first number of the second order node devices;
        based on a second quality metric associated with the second connections, determining a second route metric, representative of second relay hop paths, between the second number of the first order node devices and the first number of the second order node devices; and
        based on the first route metric and the second route metric, generating, by the first number of the second order node devices, a third route metric representative of third routes.

9. The system of claim 8, wherein the third routes comprise routes between the third order node devices and the second number of the first order node devices.

10. The system of claim 8, wherein the first number of the second order node devices is less than a total number of the second order node devices.

11. The system of claim 8, wherein the operations further comprise:
    determining the second number of the first order node devices connected to the first number of the second order node devices.

12. The system of claim 11, wherein the operations further comprise:
    determining a third number of the first order node devices connected to the first number of the second order node devices.

13. The system of claim 12, wherein the operations further comprise:
    in response to the determining the third number of the first order node devices, selecting a first route of the third routes.

14. The system of claim 13, wherein the operations further comprise:
    in response to the selecting the first route of the third routes, sending the first route to the third number of the first order node devices.

15. The system of claim 14, wherein the third routes comprise a second route between the first number of the second order node devices and the second number of the first order node devices.

16. The system of claim 15, wherein the third number of the first order node devices is less than the second number of the first order node devices.

17. A machine-readable storage medium, comprising executable instructions that, when
    executed by a processor, facilitate performance of operations, comprising:
        determining a topology of a wireless network comprising first order node devices, second order node devices, and third order node devices;

determining a first number of the second order node devices, wherein the first number of the second order node devices are connected to the third order node devices, via a first wireless connection;

based on a quality metric associated with the first wireless connection, determining a second number of the second order node devices;

in response to the determining the second number, sending a first route metric, representative of a first relay path, to the second number of the second order node devices;

determining a third number of the first order node devices, wherein the third number of the first order node devices are connected to the second number of the second order node devices, via a second wireless connection;

based on a second quality metric associated with the second wireless connection, determining a fourth number of the first order node devices;

determining a second route metric, representative of a second relay path, between the second number of the second order node devices and the fourth number of the first order node devices; and based on the first route metric and the second route metric, generating, by the second number of the second order node devices, a third route metric representative of third routes.

18. The machine-readable storage medium of claim 17, wherein the fourth number of the first order node devices is less than the third number of the first order node devices.

19. The machine-readable storage medium of claim 17, wherein the operations further comprise:

sending, by the second number of the second node devices, the third route metric to the fourth number of the first node devices.

20. The machine-readable storage medium of claim 17, wherein the operations further comprise:

in response to the sending, terminating the second wireless connection between the second number of the second node devices and the third number of the first node devices that are not the fourth number of the first node devices.

* * * * *